United States Patent
Bachraty et al.

(10) Patent No.: US 7,543,850 B2
(45) Date of Patent: Jun. 9, 2009

(54) AIRBAG

(75) Inventors: Milan Bachraty, London (GB);
Andreas Terlunen, Mühlenbeck (DE);
Matthias Liebetrau, Falkensee (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/806,666

(22) Filed: Jun. 1, 2007

(65) Prior Publication Data

US 2008/0042412 A1 Feb. 21, 2008

Related U.S. Application Data

(63) Continuation of application No. PCT/DE2005/002181, filed on Nov. 30, 2005.

(30) Foreign Application Priority Data

May 4, 2009 (DE) ........................ 10 2004 059 085

(51) Int. Cl.
*B60R 21/16* (2006.01)
(52) U.S. Cl. .................................. 280/743.1
(58) Field of Classification Search .............. 280/743.1, 280/742, 741
See application file for complete search history.

(56) References Cited

U.S. PATENT DOCUMENTS

| | | | |
|---|---|---|---|
| 5,219,179 A | 6/1993 | Eyrainer et al. | |
| 5,253,892 A | 10/1993 | Satoh | |
| 5,464,250 A | 11/1995 | Sato | |
| 5,560,649 A | 10/1996 | Saderholm et al. | |
| 5,603,526 A | 2/1997 | Buchanan | |
| 5,927,748 A | 7/1999 | O'Driscoll | |
| 5,931,497 A | 8/1999 | Fischer | |
| 6,059,312 A | 5/2000 | Staub et al. | |
| 6,224,101 B1 * | 5/2001 | Nishijima et al. | 280/743.2 |
| 6,254,121 B1 | 7/2001 | Fowler et al. | |
| 6,471,244 B1 | 10/2002 | Nishijima et al. | |
| 2003/0151233 A1 | 8/2003 | Varcus | |
| 2008/0042416 A1 * | 2/2008 | Razazi et al. | 280/743.2 |

FOREIGN PATENT DOCUMENTS

| | | |
|---|---|---|
| DE | 41 42 326 B4 | 6/1993 |
| DE | 296 09 703 U1 | 11/1996 |
| DE | 198 47 854 A1 | 4/2000 |
| DE | 42 40 760 C2 | 8/2000 |
| EP | 0 739 790 A3 | 10/1996 |
| EP | 0 922 616 A3 | 6/1999 |
| EP | 1 088 708 A3 | 4/2001 |
| EP | 1 452 403 A1 | 9/2004 |
| EP | 1452403 A1 | 9/2004 |
| EP | 1 500 560 A1 | 1/2005 |
| JP | 04-244453 A | 9/1992 |
| JP | 09-188216 A | 7/1997 |
| JP | 11-042993 A | 2/1999 |
| WO | WO 01/26936 A1 | 4/2001 |

* cited by examiner

*Primary Examiner*—Faye M. Fleming
(74) *Attorney, Agent, or Firm*—Foley & Lardner LLP (57) ABSTRACT

The disclosed airbag comprises an upper airbag layer, a lower airbag layer, and an intermediate layer dividing the interior of the airbag into a first chamber and second chamber. An outlet is provided through which gas from the first chamber is able to enter the second chamber. The outlet is configured such that, according to an amount of gas introduced into the airbag through the inlet aperture, gas selectively fills substantially only the first chamber or both first and second chambers.

34 Claims, 4 Drawing Sheets

AIRBAG

This application is a continuation of International Application PCT/DE2005/002181, which has an international filing date of Nov. 30, 2005; this International Application was not published in English, but was published in German as WO 2006/058532, both of which are incorporated herein by reference in their entirety.

BACKGROUND

The invention relates to an airbag for an airbag module of a motor vehicle.

Such an airbag may be filled with gas in order to protect an occupant of the vehicle in the event of a crash—by a sensor-controlled triggering of an associated gas generator. The airbag comprises a first airbag layer denoted as a lower airbag layer (the lower panel of the airbag, for example in the form of a fabric layer) and a second airbag layer denoted as an upper airbag layer (the upper panel of the airbag, for example in the form of a fabric layer) which are connected, for example sewn, to each other on their outer edges bearing against one another in order to form an airbag. When the airbag is installed for its intended purpose in an airbag module, the second airbag layer faces toward the occupant of the vehicle to be protected when inflated. The terms "lower airbag layer" and "upper airbag layer," therefore, do not refer to "upper" or "lower" in a spatial sense but they refer to the arrangement of the respective airbag layer relative to the occupant of the vehicle to be protected.

Furthermore, an intermediate layer (an intermediate panel, for example in the form of a fabric layer) is arranged between the upper airbag layer and the lower airbag layer and which divides the interior of the gasbag, which is encompassed by the upper airbag layer and the lower airbag layer, into two chambers. The lower airbag layer is provided with a gas inlet aperture through which gas originating from a gas generator is able to enter the first chamber of the airbag defined by the lower airbag layer and the intermediate layer. An outlet means is provided in the intermediate layer through which gas from the first chamber of the airbag is able to enter the second chamber of the airbag which is encompassed by the upper airbag layer and the intermediate layer as well as parts of the lower airbag layer, so that according to the amount of gas introduced into the airbag through the inlet aperture, substantially only the first chamber or both chambers of the airbag are selectively filled with gas and thereby inflated.

The state in which substantially only the first chamber of the airbag is inflated, may be additionally differentiated from the state in which both chambers of the airbag are inflated, primarily by the internal pressure in the two chambers of the airbag. In the first-mentioned case whereon the first chamber is inflated, the internal pressure is many times higher in the first chamber of the airbag than in the second chamber of the airbag, into which gas flows, if required, to vent the first chamber of the airbag. Therefore, a pressure level only prevails in the first chamber of the airbag which is able to allow an effective protection of an occupant of the vehicle striking the airbag by energy reduction. In the second-mentioned case where both chambers are inflated, the pressure level in the two chambers of the fully inflated airbag is at least the same value; the difference between the two chambers should not be more than 50%. In contrast, in the first-mentioned case, the level of pressure in the first chamber regularly differs from the pressure in the second chamber by orders of magnitude.

For selectively inflating the airbag with a smaller amount or a larger amount of gas, therefore, a multi-stage gas generator, in particular a two-stage gas generator, may be used of which, depending on the size, the weight and/or the seating position of the occupant of the vehicle to be protected, either only the first stage or a plurality of stages (both) are triggered. Only the first stage of the gas generator is triggered when the occupant of the vehicle to be protected is a particularly small or a particularly lightweight person, for example a so-called 5% woman. In contrast, a plurality of stages of the gas generator are produced to produce a larger amount of gas if the occupant of the vehicle to be protected is a larger and/or heavier person, for example a so-called 50% man or 95% man. The size and/or the weight as well as the seating position of the respective occupant of the vehicle to be protected may, therefore, be detected by known sensors, for example positional or weight sensors. Depending on the position, in particular the seating position, of the occupant of the vehicle to be protected, variations of the aforementioned rule may be provided when triggering the gas generator. Thus, for protecting a particularly large occupant of the vehicle, it is possible for only one stage of the gas generator to be triggered and, accordingly, substantially only one chamber of the airbag to be inflated, when the occupant to be protected is positioned with the head or upper body particularly close to the corresponding airbag module. As a result, injuries to the occupant are designed to be avoided, by the airbag expanding when inflated. Such an arrangement is known from JP-A-09-188216.

An object of an embodiment of the present invention is to further improve an airbag for an airbag module of the aforementioned type.

SUMMARY

The intermediate layer, which divides the interior of the airbag into two chambers, is secured to the first, lower airbag layer of the airbag. The outlet means through which gas from the first chamber is able to enter the second chamber of the airbag are at least partially pressure-controlled such that the outlet cross section of the outlet means is dependent on the pressure in the first chamber and thus the pressure difference between the first chamber and the second chamber of the airbag.

The solution according to an embodiment of the present invention has the advantage that the depth of deployment of the first chamber, when inflating the airbag, compared to the depth of deployment of the entire airbag is considerably reduced, so that when using the airbag for a front airbag module, in particular a driver airbag module, injury-causing contact with an occupant, who has moved the seat into one of the frontmost seating positions and is thus positioned very close to the airbag module, is avoided.

The solution according to an embodiment of the present invention is thus advantageous, in particular when the inflation of the airbag is provided with a smaller amount of gas, so that substantially only the first chamber of the airbag is filled, particularly with very small and/or very lightweight people, for example the so-called 5% woman.

The reduced depth of deployment of the first chamber of an airbag designed according to an embodiment of the present invention thus relates both to the deployment of the airbag in the direction in which the intermediate layer and the lower airbag layer are separated from one another during inflation, and to the deployment in the directions extending perpendicular thereto (radial directions with an airbag which consists substantially of circular airbag layers).

To this end, the intermediate layer is advantageously connected exclusively to the lower airbag layer and namely at a distance from the connection points along which the lower airbag layer and the upper airbag layer are connected to each other. The connection of the intermediate layer to the lower airbag layer is preferably effected along the outer edge of the intermediate layer and the sewing together of the two layers is particularly suitable as a connection technique.

As a result, therefore, the first chamber of the airbag is defined by the lower airbag layer and the intermediate layer of the airbag, whilst the second chamber of the airbag is defined by the upper airbag layer and the intermediate layer as well as a portion of the lower airbag layer.

As the outlet means in which the first chamber is in fluid communication with the second chamber of the airbag is pressure-controlled, the outlet of gas from the first chamber into the second chamber may be specifically controlled depending on how great the internal pressure generated in the first chamber is and/or how great the pressure difference between the first chamber and the second chamber of the airbag dependent thereon is. As a result, a first smaller outlet cross section from the first chamber into the second chamber may be provided when the airbag is filled with a smaller amount of gas so that substantially only the first chamber of the airbag is filled. The outlet apertures between the first and second chambers substantially serve for discharging the gas located in the first chamber into the second chamber after the impact of the occupant against the airbag for the purposes of energy reduction. If, however, the first chamber of the airbag is filled with a larger amount of gas to protect a larger and/or heavier occupant of the vehicle, the increased pressure in the first chamber may result such that an enlarged outlet cross section of the outlet apertures between the first and second chambers is provided in a pressure-controlled manner. Thus, the gases introduced into the first chamber by a gas generator are forwarded directly into the second chamber, so that both chambers of the airbag are kept ready with a correspondingly large volume for the occupant of the vehicle.

Preferably, the intermediate layer is attached to the lower airbag layer in a manner that the ratio of the volumes of the first chamber and the second chamber in the fully inflated state of the airbag is between 3:2 and 3:1.

An outlet means in the form of at least one outlet aperture is provided in the intermediate layer in which the first chamber is in fluid communication with the second chamber for venting the first chamber of the airbag in a case for protecting a relatively small and/or lightweight person only where the first chamber of the airbag has been filled with gas, and for forwarding the gases flowing initially into the first chamber of the airbag through the gas inlet aperture into the second chamber in a case where both chambers of the airbag are to be filled with gas. On the one hand, the outlet aperture may be at least one permanently open outlet aperture and/or at least one pressure-controlled outlet aperture which is only opened when the pressure of the gases which have flowed into the first chamber through the gas inlet aperture exceeds a limit, such that only then the pressure-controlled outlet apertures are opened for the gases to flow forward out of the first chamber into the second chamber of the airbag.

According to a preferred embodiment of the present invention, a combination of at least one permanently open outlet aperture and at least one pressure-controlled outlet aperture is provided. The at least one permanently open outlet aperture serves, in particular, for venting the first chamber of the airbag, in a case where this chamber is substantially exclusively inflated for protecting a relatively small and/or lightweight person and the pressure-controlled gas outlet aperture is additionally opened, when a larger amount of gas flows into the first chamber of the airbag through the gas inlet aperture, which is provided for filling both chambers of the airbag. In this case, the pressure in the first chamber of the airbag reaches such a high level that the at least one pressure-controlled outlet aperture is opened and, as a result, a larger outlet cross section is provided for forwarding gases from the first chamber into the second chamber of the airbag also to be inflated.

The pressure-controlled outlet aperture may, for example, be formed by one outlet aperture being covered by a tab which, when exceeding a predetermined pressure in the first chamber of the airbag, opens the outlet aperture, for example by tearing the tab at a weakened region.

According to one embodiment of the present invention, the tab provided for covering the pressure-controlled outlet aperture is formed integrally with a layer of the airbag and comprises a weakened region formed by a perforation or the like.

According to a further present embodiment of the invention, the tab is formed by a separate closure element connected to at least one layer of the airbag, in particular the intermediate layer thereof, the weakened region preferably being formed on the fastening points between the tab and that layer of the airbag. In this configuration, the fastening points may be tear seams, for example, or a rupturable connecting piece.

Furthermore, vent holes are preferably provided in the airbag, through which gas is able to flow out of the first chamber and/or the second chamber into the surroundings of the airbag, in order to be able to vent the airbag after filling for protecting an occupant of the vehicle. In this connection, due to the arrangement according to an embodiment of the present invention of the intermediate layer of the airbag, which separates the first chamber from the second chamber, both the vent holes serving to vent the first chamber of the airbag and those serving to vent the second chamber of the airbag into the surroundings are provided in the lower airbag layer, the respective vent hole selectively being formed by a permanently opened or a pressure-controlled vent hole.

An airbag module with an airbag according to an embodiment of the present invention is characterized in that it comprises an inflation device for inflating the airbag.

A method for inflating the airbag is provided in that (a) depending on a signal, which is representative of the size and/or the weight and/or the position of an occupant of the vehicle to be protected by the airbag, selectively a first amount or a second, larger amount of gas is introduced through the gas inlet aperture into the first chamber of the airbag, by an inflation device; (b) when introducing the first amount of gas substantially only the first chamber of the airbag, which is encompassed by the lower airbag layer and the intermediate layer, is inflated and the gas serving to inflate the first chamber subsequently is discharged for energy reduction through the outlet means from the first chamber into the second chamber; or (c) when introducing the second larger amount of gas into the first chamber of the airbag, both chambers are inflated, so that they have substantially the same internal pressure, gas flowing out of the first chamber through the outlet means into the second chamber of the airbag when inflating the airbag. At least one portion of the outlet means, by means of which gas enters from the first chamber into the second chamber, is configured to be pressure-controlled so that the flow cross section of the outlet means depends on the internal pressure of the gas in the first chamber.

It is to be understood that both the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1A:
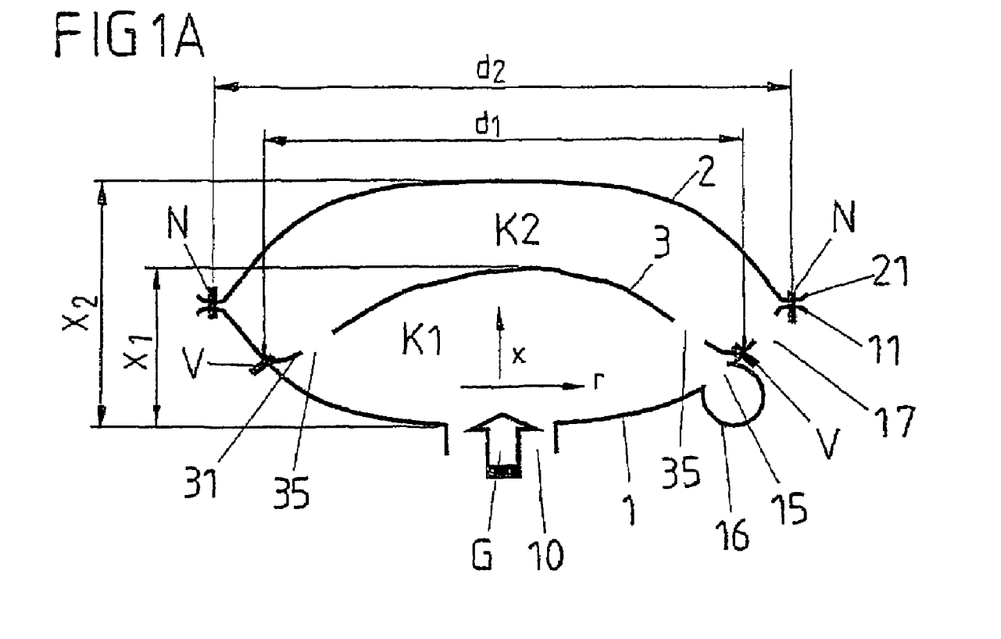
FIG. 1A is a cross section of a first embodiment of an airbag for an airbag module, which is formed by a lower panel, an upper panel connected thereto, as well as an intermediate panel for dividing the interior of the airbag into two chambers, in the filled state.
Figure 1B:
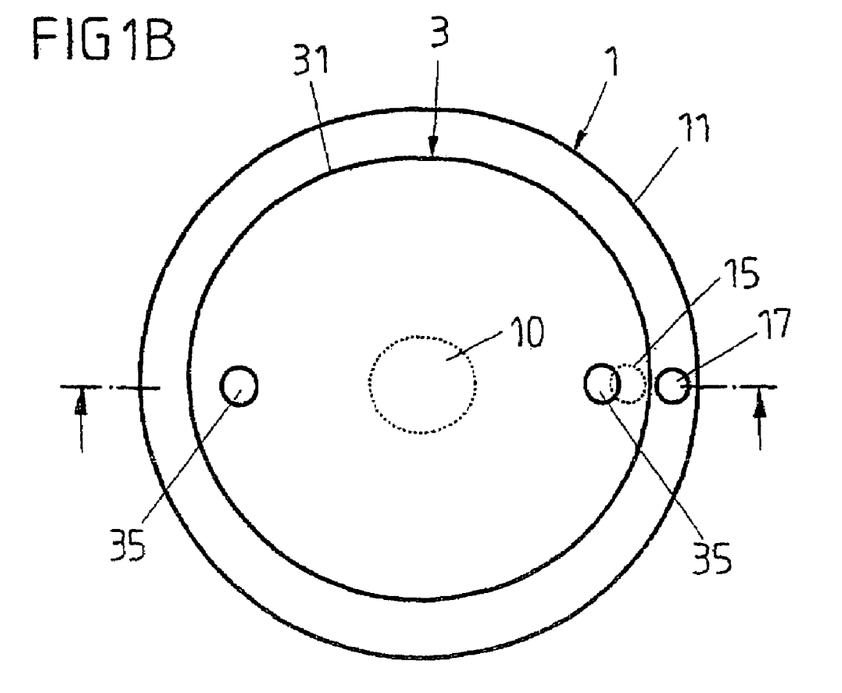
FIG. 1B is a plan view of the lower panel and the intermediate panel of the airbag of FIG. 1A.

An airbag for an airbag module of a motor vehicle is shown in FIGS. 1A and 1B, of which the outer casing is formed by a first fabric layer denoted as the lower panel 1 and a second fabric layer connected thereto, denoted as the upper panel 2, which are respectively substantially circular and connected to each other along their outer edge 11, 21 by a seam N. Such an airbag is suitable, in particular, for use in a driver airbag module to be arranged on the steering wheel of a motor vehicle.

The fabric layer of the airbag which, after inflating the airbag faces the occupant of the vehicle to be protected, is denoted as the upper panel 2. The fabric layer, which is assigned to the inflation device and which has a gas inlet aperture 10 through which gases G originating from the inflation device are able to enter the airbag, is denoted as the lower panel 1.

The inside of the airbag shown in FIG. 1A in the inflated state is divided into two chambers K1, K2 by a third fabric layer denoted in the embodiment as the intermediate panel 3. The intermediate panel 3 which is also of substantially circular configuration and defined at the edge by a circular arc is secured along its outer edge 31 at connecting points V formed by a seam to the lower panel 1. The connecting points V in which the intermediate panel 3 is fastened to the lower panel 1, are spatially distanced from the connecting points formed by the seams N between the lower panel 1 and the upper panel 2, and namely in the direction of the gas inlet aperture 10 arranged centrally in the lower panel 1, through which gases G are able to flow to the inside of the airbag.

The portion of the lower panel 1 which defines the second chamber K2 of the airbag, together with the upper panel 2 and the intermediate panel 3, is therefore located between the connecting points N in which the lower panel 1 and the upper panel 2 are connected to each other and the connecting points V in which the lower panel 1 and the intermediate panel 3 are connected to each other.

The intermediate panel 3 is preferably of such a size and is secured to the lower panel 1 such that the volume of the first chamber K1 of the airbag which is defined by the lower panel 1 and the intermediate panel 3, forms a volume ratio of between 3:2 and 3:1 to the volume of the second chamber K2 which is defined by the upper panel 2, the intermediate panel 3, and a portion of the lower panel 1. The volume of the first chamber K1 is, therefore, preferably greater than the volume of the second chamber K2, and in particular by one and a half to three times.

The two chambers K1, K2 of the airbag are connected to each other via a plurality, for example two, outlet apertures 35 provided in the intermediate panel 3. Said outlet apertures are configured in the embodiment, insofar as is visible in FIGS. 1A and 1B, for the sake of simplicity as permanently open outlet apertures 35; preferably, however, at least one portion of the outlet apertures provided in the intermediate panel 3 is pressure-controlled, as is described in more detail hereinafter with reference to FIGS. 2A and 2B.

Furthermore, vent holes 15, 17 are provided in the casing of the airbag in which the first chamber K1 and/or the second chamber K2 of the airbag are connected to the surroundings, so that gas is able to escape from the respective chamber K1, K2 of the airbag into the surroundings.

In the present case, both the vent hole 15, in which the first chamber K1 is connected to the surroundings of the airbag, and the vent hole 17, in which the second chamber K2 of the airbag is connected to the surroundings, are respectively provided in the lower panel 1. The first-mentioned vent hole 15 is located, therefore, in the region of the lower panel 1 which defines the first chamber K1, and the second-mentioned vent hole 17 is located in the region of the lower panel 1 which defines the second chamber K2.

In this configuration, the vent hole 15 associated with the first chamber K1 is configured as a pressure-controlled vent hole, which is only opened when the pressure in the first chamber K1 has reached a specific minimum value (threshold value). To this end, the vent hole 15 may be covered by a membrane 16 or by a closure element provided with a tear seam so that the vent hole 15 is opened when a minimum value of the internal pressure in the first chamber K1 is reached and/or exceeded by rupturing the membrane and/or the tear seam.

In this case, the vent hole 17 associated with the second chamber K2 is configured as a permanently open vent hole in the lower panel 1 of the airbag, which could also be provided in the upper panel 2 of the airbag. It is important that this vent hole 17 is provided in the area of the panels 1, 2 of the panels 1, 2, 3 of the airbag defining the second chamber K2, in which the vent hole faces toward the outside (and not toward the first chamber K1). The vent hole is preferably located in the vicinity of the connecting points N in the form of seams in which the upper panel 2 and the lower panel 1 are connected to each other.

According to the requirements which prevail when using the airbag shown with reference to FIGS. 1A and 1B in a specific airbag module as well as specific vehicle surroundings, a vent hole facing toward the outside may be selectively associated with each of the two chambers K1, K2 of the airbag (as shown in the embodiment) or only one of the two chambers K1, K2. Furthermore, it may be established in each individual case whether the vent hole 15, 17 associated with the respective chamber K1, K2 and serving to vent into the surroundings, is configured as a permanently open vent hole or as a pressure-controlled vent hole. In contrast to the embodiment shown with reference to FIGS. 1A and 1B, a permanently open vent hole may therefore also be associated with the first chamber K1 and a pressure-controlled vent hole may be associated with the second chamber K2, or optionally also a permanently open vent hole may be associated with both chambers or a pressure-controlled vent hole may be associated with both chambers.

An airbag of the type shown with reference to FIGS. 1A and 1B is suitable for optimally adapted protection of vehicle occupants of very different sizes, i.e., for protecting particularly small and/or particularly lightweight occupants of the vehicle (for example, 5% woman) with only the first chamber K1 of the airbag 1 being inflated in the event of a crash while protecting larger occupants of the vehicle (for example, 50% man and/or 95% man) with both chambers K 1 and K2 of the airbag being filled with gas in the event of a crash. To this end, the airbag is coupled via its gas inlet aperture 10, for example, to a two-stage gas generator as an inflation device, of which only the first stage is triggered, when only the first chamber K1 of the airbag is to be filled with gas, and of which both stages are triggered when both chambers K1 and K2 of the airbag are to be inflated. Accordingly, in the second-mentioned case, a larger amount of gas is provided by the two stages of the gas generator to inflate the airbag than in the first-mentioned case by only one stage of the gas generator. The control of the gas generator is effected, therefore, according to the size and/or the weight of the occupant of the vehicle to be protected, i.e. for example of the driver of a motor vehicle, which may be detected by known positional sensors and weight sensors.

As a modification to the disclosed embodiment, more than two chambers may also be provided in an airbag, of which depending on the weight and/or the size as well as the current seating position of an occupant of the vehicle to be protected, one respective specific portion is filled with gas. In this case, a multi-stage gas generator is associated with the airbag, in which the number of stages advantageously corresponds to the number of different chambers of the airbag.

Hereinafter, the inflation behavior of the airbag shown in FIGS. 1A and 1B, i.e. for example an airbag with two chambers for protecting vehicle occupants of different sizes, is disclosed.

In this configuration, taken as a first starting point is a crash in which an occupant of the vehicle is to be protected from injuries by an airbag of the type shown with reference to FIGS. 1A and 1B, who has been identified by an associated sensor device as a particularly small and/or lightweight person, so that in the event of a crash only the first stage of an associated gas generator is triggered and gases G are produced, which enter through the exhaust gas inlet aperture 10 of the airbag 1 into the first chamber K1 thereof. The internal pressure prevailing in the first chamber K1 of the airbag as well as the inflation time required for inflating the first chamber K1, are determined, therefore, by the features of the gas generator used for gas production on the one hand, and by the size of the outlet apertures 35 provided in the intermediate panel 3 on the other hand.

The pressure-controlled vent hole 15 in the lower panel 1, further associated with the first chamber K1, is, however, designed such that it is not yet opened when the first chamber K1 of the airbag is inflated.

If the occupant to be protected eventually strikes the airbag, of which the first chamber K1 has been inflated by the gases G entering through the gas inlet aperture 10, the energy reduction is carried out by a drop in pressure, accompanied by the displacement of gases located in the first chamber K1. Gases are initially displaced through the outlet apertures 35 in the intermediate panel 3 into the second chamber K2 of the airbag, from where they are able to enter the surroundings through the vent hole 17 associated with the second chamber K2. Furthermore, gases are able to escape directly from the first chamber K1 into the surroundings through the pressure-controlled vent hole 15 associated with the first chamber K1, after the pressure increase associated with the striking of an occupant of the vehicle (i.e., a lightweight person striking at high speed) in the first chamber K1 of the airbag has led to a rupture and/or a tearing of the closure element 16 of the vent hole 15.

Alternatively, however, the pressure-controlled vent hole 15 associated with the first chamber K1 may also be designed such that it also remains closed during the pressure increase in the first chamber K 1 which occurs with the striking of the occupant of the vehicle, and is only opened by rupturing and/or tearing of the closure element 16 if, for protecting a correspondingly larger and heavier person, both stages of the gas generator have been triggered for inflating the airbag and the correspondingly large and heavy person has struck the airbag, with the result of a corresponding pressure increase in the airbag.

If the airbag is triggered in the event of a crash for protecting such a larger and heavier person, both generator stages are therefore triggered. Now both chambers K1 and K2 of the airbag and thus a correspondingly larger volume of the entire system is to be provided for the energy reduction when the occupant strikes the airbag. The second chamber K2 of the airbag is filled by the gases initially entering the first chamber K1 through the gas inlet aperture 10 flowing through the permanently open outlet apertures 35 of the intermediate panel 3 into the second chamber K1. The internal pressure thus prevailing in the two chambers K1, K2 as well as the inflation time are also determined here by the size of the outlet apertures 35 in the intermediate panel 3, which are preferably able to be at least partially pressure-controlled.

The pressure-controlled vent hole 15 associated with the first chamber K1 is, therefore, preferably designed such that it is initially not opened by the internal pressure produced in the two chambers K1, K2 when the airbag is inflated.

When the occupant of the vehicle strikes the airbag inflated in both chambers K1, K2, the energy reduction is carried out by the pressure drop associated with the displacement of gases out of both chambers K1, K2. This is carried out, on the one hand, through the pressure-controlled vent hole 15 of the first chamber K1 which is opened by the pressure rise which occurs when the occupant of the vehicle strikes the airbag and through which both the gases from the first chamber K1 are able to escape directly and the gases from the second chamber K2 are able to escape indirectly (after flowing back through the outlet apertures 35 into the first chamber K1). Additionally, gases are also able to escape directly from the second chamber K2 into the surroundings, if, as shown in FIGS. 1A and 1B, a further outlet aperture 17 is provided at that point.

With reference to FIG. 1A, it is apparent that the inflated first chamber K1 has, both in the direction x along which the airbag is deployed in the direction of the occupant to be protected, a markedly smaller expansion $x_1$ than the fully inflated airbag with its corresponding expansion $x_2$ and in the radial direction r (i.e., perpendicular to the main deployment direction of the airbag) a smaller expansion $d_1$ than the fully inflated airbag with its radial expansion $d_2$. This is achieved by the third fabric layer forming the intermediate panel 3 being fastened exclusively to the first fabric layer forming the lower panel 1 and at a distance from the connecting points N between the lower panel 1 and the upper panel 2.

Figure 2A:
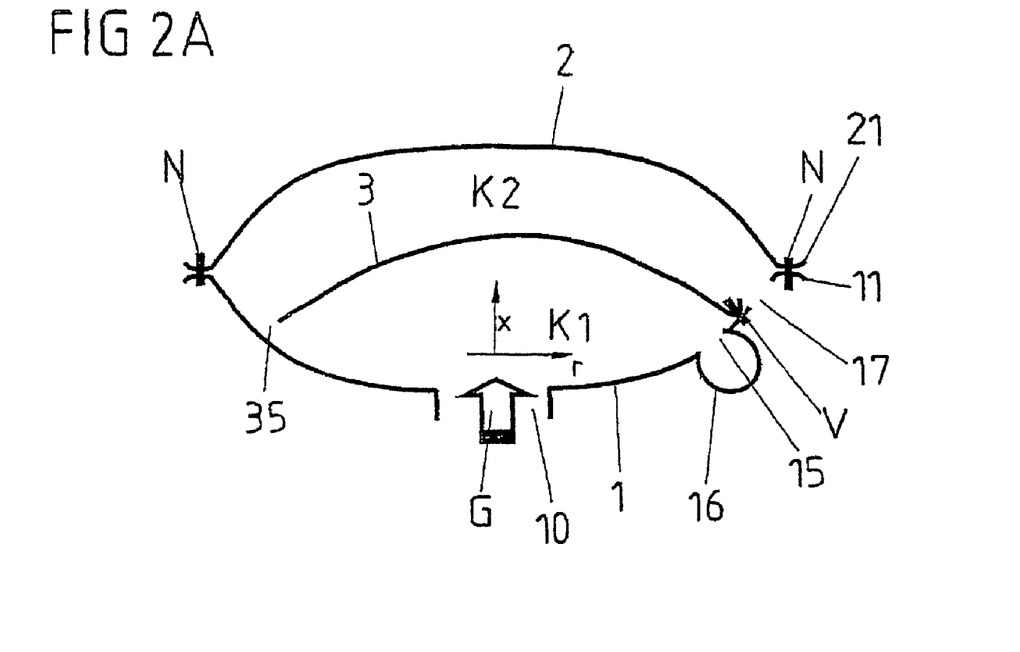
FIG. 2A is a cross section of an alternate embodiment of the airbag of FIGS. 1A and 1B.
Figure 2B:
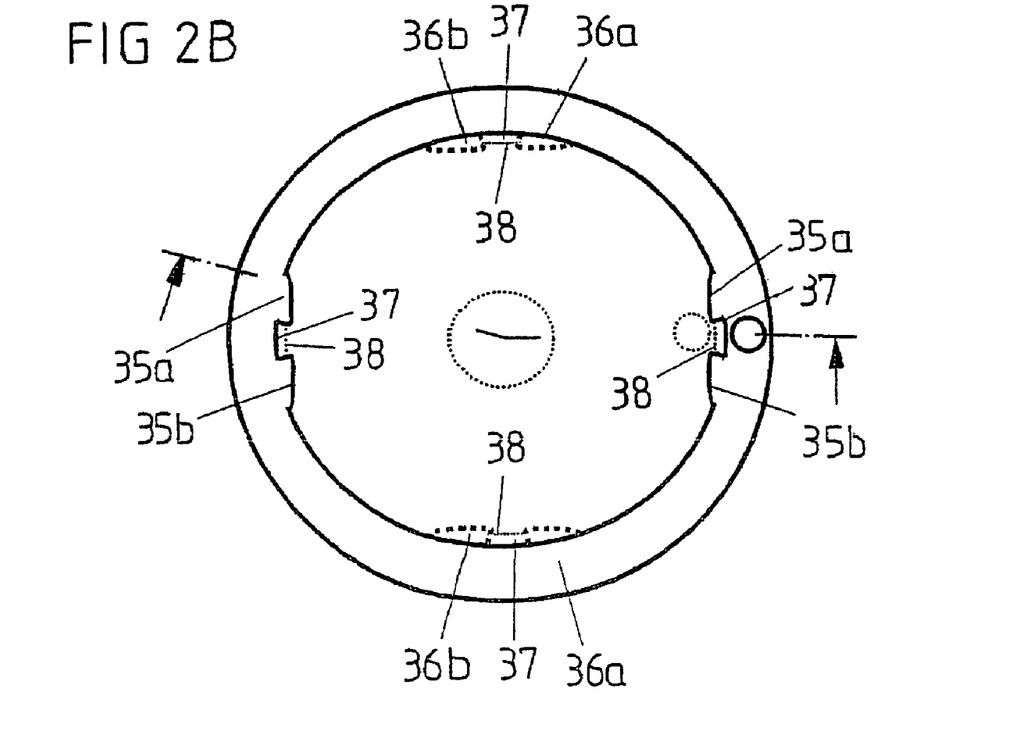
FIG. 2B is a view of the lower panel and intermediate panel of the airbag of FIG. 2A.

An alternative embodiment from FIGS. 1A and 1B is shown in FIGS. 2A and 2B, the difference being in the design of the outlet apertures in the intermediate panel 3 in which the first chamber K1 and the second chamber K2 are in fluid communication with each other.

In the embodiment shown in FIGS. 1A and 1B, the cross section of the outlet apertures 35 provided in the intermediate panel 3 may be selected such that, in the case of inflating only the first chamber K1 for protecting a small, lightweight person, they serve for venting the first chamber K 1 into the second chamber K2 and, at the same time, in the case of inflating both chambers K1, K2 of the airbag for protecting a correspondingly larger, heavier person they allow the passage of gases from the first chamber K1 into the second chamber K2 for simultaneous inflation by both gases. In both cases, therefore, comparable internal pressures and inflation times are achieved, in the first-mentioned case only the first chamber K1 and in the second-mentioned case both chambers K1, K2 being affected. To this end, in order to be able to adapt selectively the cross section of the outlet apertures, according to whether only the first chamber K1 or both chambers K1 and K2 of the airbag are to be inflated, the outlet apertures are partially pressure-controlled in the embodiment shown in FIGS. 2A and 2B.

The arrangement shown in FIGS. 2A and 2B differs from that shown in FIGS. 1A and 1B merely in the design of the outlet apertures in the intermediate panel 3 of the airbag, only the design of these outlet apertures and their function are detailed below. Moreover, reference is made to the explanations of FIGS. 1A and 1B, identical reference numerals being used for easier understanding of the connection between corresponding components and units in FIGS. 1A and 1B, on the one hand, and FIGS. 2A and 2B, on the other hand. Thus, (pressure-controlled) outlet apertures of the type shown in FIGS. 2A and 2B may be advantageously provided in the embodiment according to FIGS. 1A and 1B.

According to FIGS. 2A and 2B, the intermediate panel 3 has along its edge (distributed uniformly in the peripheral direction, as shown, or unevenly distributed) a plurality of outlet apertures 35a, 35b; 36a, 36b which are respectively partially covered by a tab 37 and thereby are divided up into two partial apertures 35a and 35b and/or 36a and 36b. By the type of arrangement of the outlet apertures 35a, 35b; 36a, 36b along the edge of the intermediate panel 3, the lateral inflation behavior of the airbag may, therefore, be controlled during deployment. In order to clarify this, in FIG. 2B, a portion of the outlet apertures (36a, 36b) is shown in dotted lines as an optional outlet aperture.

The tear tab 37 associated with the respective outlet aperture 35a, 35b; 36a, 36b is preferably formed integrally on the intermediate panel 3 and connected to the lower panel 1 via a tear region 38 which tears open at a specific predetermined pressure, so that the respective outlet aperture 35a, 35b; 36a, 36b is correspondingly enlarged, i.e. has a larger flow cross section.

Departing from the embodiment shown in FIGS. 2A and 2B, separate permanently open outlet apertures, on the one hand, may also be provided in the intermediate panel 3 and pressure-controlled outlet apertures, on the other hand. Namely, on the one hand, permanent outlet apertures 35 of the type also shown in FIGS. 1A and 1B as well as, on the other hand, separate pressure-controlled outlet apertures 15 of the type also shown in FIGS. 1A and 1B may be provided. It is, however, important that it is possible to control the outlet apertures located between the first chamber K1 and the second chamber K2 such that the flow cross section is able to be altered for the gases flowing from the first chamber K1 into the second chamber K2 depending on whether the chamber K1, inflated to protect a lightweight person, is to be vented into the second chamber K2 or whether the gases escaping from the first chamber K1 into the second chamber K2 are to allow a uniform inflation of both chambers K1, K2 for protecting a correspondingly large, heavy occupant of the vehicle.

If, with the airbag arrangement shown in FIGS. 2A and 2B for protecting a small, lightweight person, only the first chamber K1 of the airbag is inflated, as disclosed above with reference to FIGS. 1A and 1B, the first chamber K1 is therefore vented for the purpose of pressure reduction only through the partial apertures 35a, 35b and possibly 36a, 36b of the outlet apertures which, moreover, are still partially closed by the respective tab 37.

If, however, for protecting a correspondingly larger, heavier person by triggering both stages of an associated gas generator, both chambers K1, K2 of the airbag are inflated, as a result of the increased internal pressure in the first chamber K1, into which gases G originating from both stages of the gas generator now flow through the gas inlet aperture 10, the tabs 37 associated with the respective outlet aperture 35a, 35b; 36a, 36b are torn from the lower panel 1, so that a correspondingly larger flow cross section for forwarding gases from the first chamber K1 into the second chamber K2 is provided in the outlet apertures 35a, 35b; 36a, 36b, with the purpose of inflating both chambers K1, K2 as uniformly as possible.

As a result, in the embodiment shown with reference to FIGS. 2A and 2B, the flow cross section of the outlet apertures, in which the first chamber K1 is in fluid communication with the second chamber K2, may be specifically adjusted and differentiated according to whether the outlet apertures are to serve for venting the first chamber K1 or are to effect a uniform filling of the first chamber K1 and second chamber K2 of the airbag.

Figure 3A:
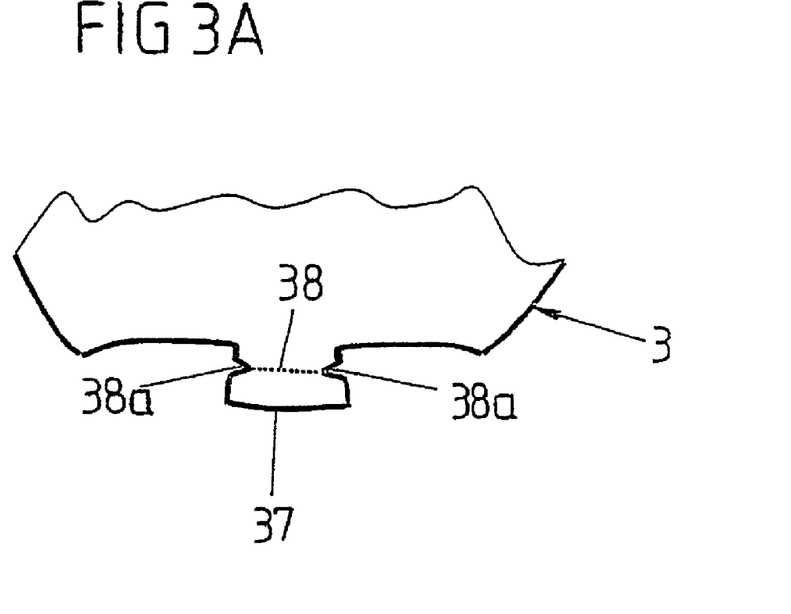
FIGS. 3A to 3C are partial views showing three different embodiments of a tear tab for use in the airbag shown in FIGS. 2A and 2B.

In FIG. 3A, the tab 37 which is shown in FIGS. 2A and 2B, with which the outlet apertures of the lower panel 3 are partially covered and thus closed, is shown enlarged. It is apparent in particular that the tear-off region 38 of the respective tab 37 is predefined by lateral notches and/or perforations.

Figure 3B:
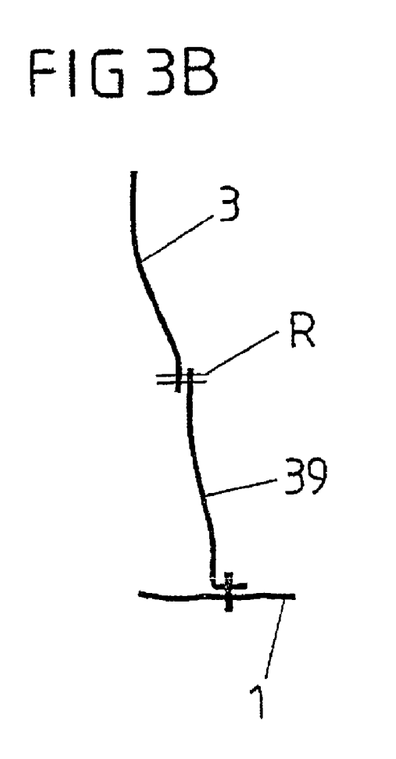

FIG. 3B shows an embodiment of a tab 39 provided for (partially) closing an outlet aperture of the intermediate panel 3 which, on the one hand, is fixedly connected to the lower panel 1 of the airbag and, on the other hand, is connected via a tear seam R to the intermediate panel 3 thereof. This tear seam R is designed such that, under the action of the internal pressure in the first chamber K1 (see FIGS. 1A and 2A) of the airbag, it tears open, when said airbag is filled with a larger amount of gas, corresponding to the triggering of both stages of the gas generator.

Figure 3C:
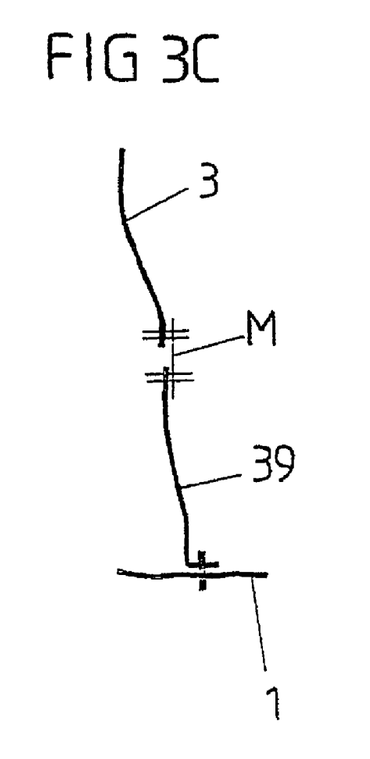

FIG. 3C shows a modification of the arrangement of FIG. 3B in which the tab 39 is connected to the intermediate panel 3 via a tearable material M, for example a tearable membrane or a bonded-on silicone layer.

Figure 4A:
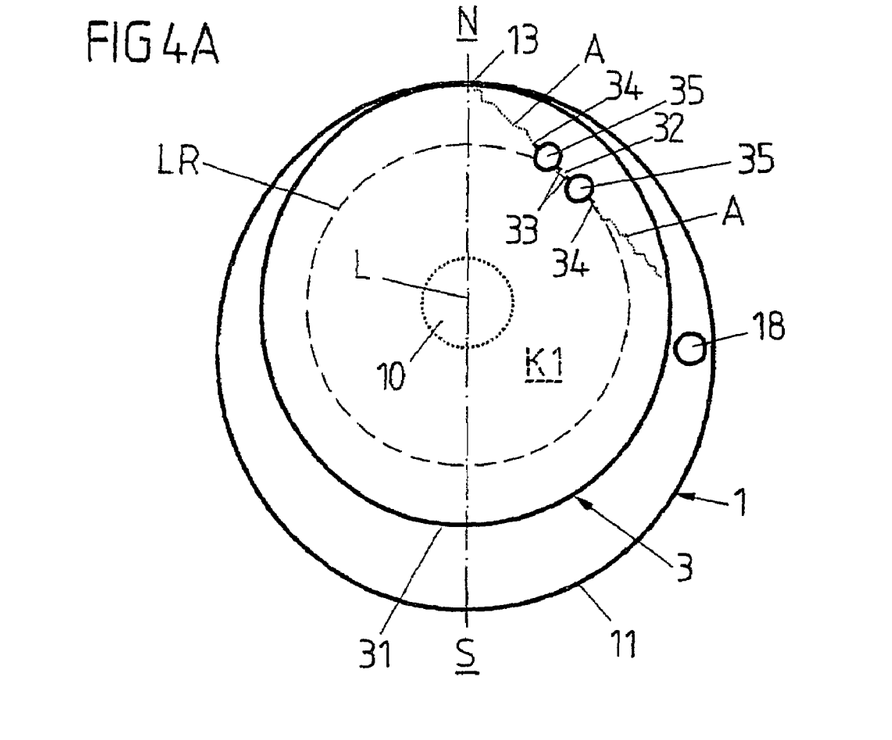
FIG. 4A is a plan view of the lower panel and intermediate panel of an alternative embodiment of the airbag of FIG. 1A.
Figure 4B:
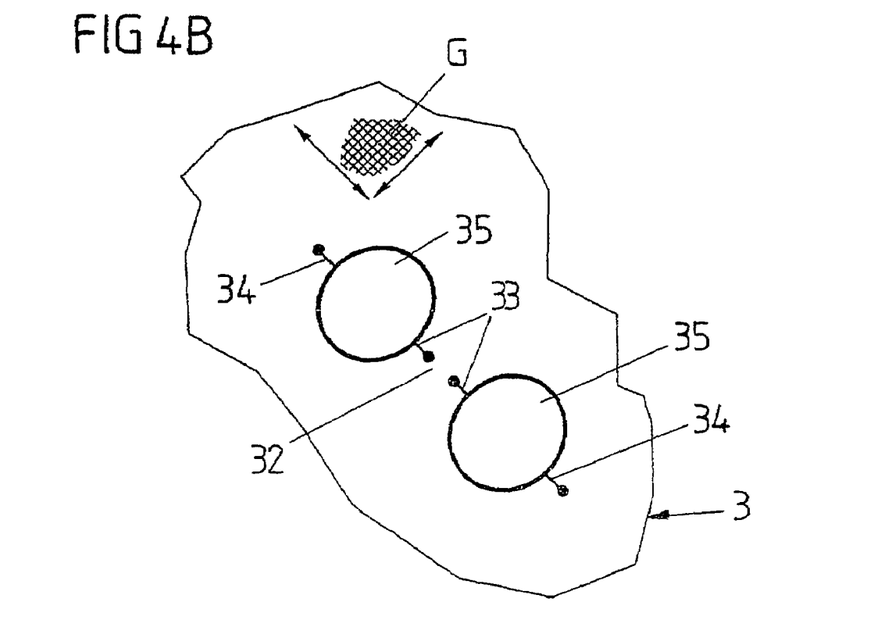
FIG. 4B is a detailed view of the intermediate panel of FIG. 4A.

In FIGS. 4A and 4B, an alternate embodiment of the present invention from FIGS. 1A and 1B as well as 2A and 2B is shown in which one difference is that, according to FIG. 4A, the lower panel 1 and the intermediate panel 3 are not of circular configuration but of slightly oval configuration. In this connection, the airbag arrangement may be positioned as a component of a driver airbag module against an associated steering wheel such that the airbag arrangement with panels 1, 3 has its greatest longitudinal extension between the 12 o'clock position N (north) and the 6 o'clock position S (south) of the steering wheel. The 6 o'clock position of the steering wheel and/or the schematically indicated steering wheel rim LR, on the one hand, and the 12 o'clock position of the steering wheel and/or the steering wheel rim LR, on the other hand, is defined such that, in the straight-ahead driving position of a motor vehicle, the connection line L of the 6 o'clock position S to the 12 o'clock position N faces in the direction of travel. The 12 o'clock position of the steering wheel rim LR faces the windscreen of a motor vehicle and the 6 o'clock position of the steering wheel rim LR faces the vehicle interior in the straight-ahead driving position.

In this configuration, the intermediate panel 3 is arranged offset relative to the lower panel 1 in the direction of the 12 o'clock position N, such that the peripheral outer edge 11 of the lower panel 1 and the peripheral outer edge 31 of the intermediate panel 3 are in contact with each other in the region 13 of the 12 o'clock position. This allows, according to a preferred embodiment, a one-piece design of the lower panel 1 and the fabric panel 3, i.e. the design thereof, for example, as an integral fabric part, each integral connection of the lower panel 1 and the intermediate panel 3 preferably taking place only in the region 13 of the 12 o'clock position N. Outside that region 13, the intermediate panel 3 is connected along its peripheral outer edge 31 by suitable connecting means, for example in the form of seams, to the lower panel 1.

According to the offset arrangement of the intermediate panel 3 relative to the lower panel 1 in the embodiment shown in FIGS. 4A and 4B, the first chamber K1 defined by the lower panel 1 and the intermediate panel 3 (see also FIGS. 1A and 2A) is also arranged offset toward the 12 o'clock position N.

The gas inlet aperture 10 is, in turn, configured on the lower panel 1, such that it is located in the center of the intermediate panel 3 as observed in the plan view of the lower panel 1 and the intermediate panel 3 according to FIG. 4A. Therefore, the aperture 10 is simultaneously arranged concentrically to the hub of the associated steering wheel and/or concentrically to the steering wheel rim LR thereof. As a result, in the lower airbag region located in the 6 o'clock position S in the inflated state, an enlarged airbag volume is provided, in particular, between the steering wheel rim LR and the abdomen region of an occupant of the vehicle to be protected, and thus improves the restraint of the occupant.

According to FIGS. 4A and 4B, the intermediate panel 3 comprises two permanently open outlet apertures 35 which are arranged asymmetrically relative to the connecting line L between the 12 o'clock position N and the 6 o'clock position S of the associated steering wheel and on the same side of the connecting line L. In this configuration, the outlet apertures 35 are slightly distanced from the outer edge 31 of the intermediate panel 3.

By means of this asymmetrical, eccentric arrangement relative to the connecting line L of the permanently open outlet apertures 35, the outlet apertures are prevented from being closed when a small occupant strikes the airbag arrangement (the outlet apertures 35 being intended to allow the outflow of gas from the first chamber K1 into the second chamber K2, not shown in FIG. 4A, see FIGS. 1A and 2A).

Additionally, the intermediate panel 3 comprises a pressure-controlled outlet aperture which, on the one hand, is defined by two slots 33 which extend from the two permanently open outlet apertures 35 toward one another and which, in the region between the two slots 33, define a tab 32 as a closure element. Additionally, from the two permanently open outlet apertures, one respective slot 34 departs outward in a direction away from the other respective opposing outlet aperture. Referring to the detailed view of the intermediate panel 3 in the vicinity of the permanently open outlet apertures 35 in FIG. 4B, it is therefore apparent that the slots 33, 34 which, in particular, may be slits, extend respectively in the direction of extension of the threads of the fabric G forming the intermediate panel 3, namely in the direction of the warp or the weft of the fabric.

Furthermore, according to FIG. 4A in the lower panel 1, a pressure-controlled vent hole 18 is provided, through which gas is able to flow out of the second chamber K2, not shown additionally in FIGS. 4A and 4B (see FIGS. 1A and 2A) into the surroundings. This vent hole 18 is preferably closed in the manner of the pressure-controlled vent hole 15 of FIGS. 1A and 2A by a membrane, which is only ruptured when a predefinable minimum pressure in the associated chamber is reached and/or exceeded and, as a result, opens the vent hole 18. Alternatively, the pressure-controlled vent hole 18, as in the case of the embodiments according to FIGS. 1A, 1B and 2A, 2B, may be provided in a region of the lower panel 1 which borders the first chamber K1.

If the airbag arrangement shown in FIGS. 4A and 4B is triggered to protect a relatively small and/or lightweight person, for example a so-called 5% woman, by only one of the two stages of an associated two-stage gas generator being triggered, initially only the first chamber K1 located between the lower panel 1 and the intermediate panel 3 is filled with gas as the internal pressure produced by the amount of gas originating from only one generator stage, in the first chamber K1, is not sufficient to open a further pressure-controlled outlet aperture in the intermediate panel 3, in addition to the permanently open outlet apertures 35. The energy of an occupant of the vehicle striking the airbag arrangement provided with an inflated first chamber K1 is then, as already disclosed above with reference to the arrangement from FIGS. 1A and 1B, reduced by the displacement of the gases out of the first chamber K1 into the second chamber K2, not shown additionally in FIG. 4A, the gases flowing through the permanently open outlet apertures 35.

If the airbag arrangement shown in FIGS. 4A and 4B is accordingly inflated for protecting a larger and/or heavier occupant of the vehicle, for example a so-called 50% man, by both stages of the associated gas generator being triggered, a considerably larger internal pressure is produced in the first chamber K1 which results in the fabric G of the intermediate panel 3 tearing open, starting from the slots 33, 34 along the corresponding fabric threads. As a result, on the one hand, the tab 32 formed between the two permanent outlet apertures 35 and/or the slots 33 departing therefrom is/are ruptured, so that the two permanently open outlet apertures 35 together with the region located therebetween form a correspondingly larger outlet aperture. Furthermore, the slots 34 projecting outwardly from the permanently open outlet apertures 35, when a corresponding pressure is applied, cause the fabric G to tear open along a tear line A defined by the fabric threads as far as the outer edge 31 of the intermediate panel 3. As a result, a particularly large (pressure-controlled) outlet aperture is provided which, on the one hand, is defined by the tear line A and, on the other hand, by the outer edge 31 of the intermediate panel 3. (The resulting outlet aperture is all the larger, the greater the distance of the permanently open outlet apertures 35 from the outer edge 31 of the intermediate panel 3). This allows a particularly rapid inflow of gases from the first chamber K1 into the second chamber K2 (not visible in FIG. 4A)(see FIGS. 1A and 2A) so that a larger opening cross section for a rapid filling of the entire airbag volume is provided by the gases flowing out of the first chamber K 1 into the second chamber.

Due to the large flow cross section in which the two chambers of the airbag arrangement in the embodiment according to FIG. 4A are connected to each other, in the event of the formation of a pressure-controlled aperture in the intermediate panel 3, gases may subsequently flow out from both chambers K1, K2 into the surroundings, in order to reduce the impact energy, selectively through a vent hole 18 provided in the first chamber K1 and/or in the second chamber K2.

A method for inflating the airbag is provided in that (a) depending on a signal, which is representative of the size and/or the weight and/or the position of an occupant of the vehicle to be protected by the airbag, selectively a first amount or a second, larger amount of gas is introduced through the gas inlet aperture into the first chamber of the airbag, by means of an inflation device, (b) when introducing the first amount of gas substantially only the first chamber of the gasbag, which is encompassed by the lower airbag layer and the intermediate layer, is inflated and the gas serving to inflate the first chamber subsequently is discharged for energy reduction through the outlet means from the first chamber into the second chamber or (c) when introducing the second larger amount of gas into the first chamber of the airbag, both chambers are inflated, so that they have substantially the same internal pressure, gas flowing out of the first chamber through the outlet means into the second chamber of the airbag when inflating the airbag. At least one portion of the outlet means, by means of which gas enters from the first chamber into the second chamber is configured to be pressure-controlled so that the flow cross section of the outlet means depends on the internal pressure of the gas in the first chamber.

The method is characterized in that the flow cross section of the outlet means is controlled according to whether the first amount of gas or the second, larger amount of gas is supplied into the airbag; the outlet means has a larger cross section when the second, larger amount of gas is supplied into the airbag; the enlargement of the cross section of the outlet means is effected by the increased internal pressure of the first chamber of the airbag when introducing the second, larger amount of gas into the airbag, and the increased internal pressure in the first chamber of the airbag when introducing the second, larger amount of gas ruptures or tears a closure element associated with the outlet means.

The priority application, German Application DE 10 2004 059 085.0, filed on Dec. 2, 2004, including the specification, drawings, claims, and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and sprit of the present invention are to be included as further embodiments of the present invention. The scope of the present invention is to be defined as set forth in the following claims.

What is claimed is:

1. An airbag for an airbag module of a motor vehicle, comprising:
    an upper airbag layer configured to face an occupant in an inflated state;
    a lower airbag layer connected to the upper airbag layer;
    an intermediate layer secured to the lower airbag layer and arranged between the upper and lower airbag layers, wherein the intermediate layer divides an interior of the airbag into a first chamber formed by the lower airbag layer and the intermediate layer and a second chamber formed by the intermediate layer and the upper airbag layer;
    a gas inlet aperture through which gas originating from an inflation device is able to enter the first chamber; and
    an outlet comprising an aperture bounded by a periphery through which gas from the first chamber is able to enter the second chamber,
    wherein the outlet is configured such that, according to an amount of gas introduced into the airbag through the inlet aperture, gas selectively fills substantially only the first chamber or both the first and second chambers, and
    wherein the outlet is at least partially pressure-controlled such that the periphery of the aperture through which gas from the first chamber flows into the second chamber is torn based on the gas pressure in the first chamber which results in a change in the size of the aperture.

2. The airbag according to claim 1, wherein the intermediate layer is connected exclusively to the lower airbag layer.

3. The airbag according to claim 1, wherein the intermediate layer is connected to the lower airbag layer along a peripheral outer edge.

4. The airbag according to claim 1, wherein first connecting points between the intermediate layer and the upper airbag layer are distanced from second connecting points between the upper airbag layer and the lower airbag layer.

5. The airbag according to claim 1, wherein the intermediate layer is sewn to the lower airbag layer.

6. The airbag according to claim 1, wherein when the airbag is fully inflated a volume of the first chamber of the airbag is greater than a volume of the second chamber.

7. The airbag according to claim 6, wherein a ratio of the volumes of the first and second chambers is between 3:2 and 3:1.

8. The airbag according to claim 1, wherein the first chamber is defined by the lower airbag layer and the intermediate layer, and wherein the second chamber is defined by the upper airbag layer, the intermediate layer, and a portion of the lower airbag layer.

9. The airbag according to claim 1, wherein the aperture of the outlet is between the first chamber and the second chamber.

10. The airbag according to claim 9, wherein the outlet is provided in the intermediate layer.

11. The airbag according to claim 9, wherein the outlet further comprises at least one permanently open outlet aperture.

12. The airbag according to claim 1, wherein pressure control of the outlet is carried out by at least one closure element which opens up the aperture of the outlet when a predetermined pressure is exceeded.

13. The airbag according to claim 12, wherein the closure element comprises a tab configured to be torn or ruptured for opening up the aperture of the outlet.

14. The airbag according to claim 12, wherein the closure element comprises weakened regions for forming set tear points.

15. The airbag according to claim 14, wherein the weakened regions of the closure element is formed by perforations or notches.

16. The airbag according to claim 14, wherein the weakened region is formed by fasteners for fastening the closure element to an airbag layer.

17. The airbag according to claim 16, wherein the weakened region is formed by a rupturable material portion in which the closure element is connected to the airbag layer.

18. The airbag according to claim 12, wherein the closure element is formed integrally with a layer of the airbag.

19. The airbag according to claim 18, wherein the closure element is formed integrally with the intermediate layer.

20. The airbag according to claim 12, wherein the closure element is formed by a separate element connected to at least one layer of the airbag.

21. The airbag according to claim 20, wherein the closure element is connected to the intermediate layer.

22. The airbag according to claim 20, wherein the weakened region is formed by a tear seam by which the closure element is connected to the at least one layer of the airbag.

23. The airbag according to claim 1, wherein the aperture of the outlet is defined by at least one slot in a layer of the airbag, wherein surroundings of the slot is configured to be able to tear open so as to open the outlet aperture.

24. The airbag according to claim 23, wherein the at least one slot is arranged and configured such that the layer of the airbag provided with the at least one slot is able to tear open starting from the slot along at least one tear line as far as an outer edge of the layer of the airbag provided with the at least one slot.

25. The airbag according to claim 23, wherein the layer of the airbag provided with the at least one slot is the intermediate layer.

26. The airbag according to claim 1, further comprising at least one vent hole through which gas may escape from the first chamber, the second chamber, or any combination thereof into surroundings.

27. The airbag according to claim 26, wherein the at least one vent hole is provided in the lower airbag layer.

28. The airbag according to claim 26, wherein the at least one vent hole is configured as a permanently open or a pressure-controlled aperture.

29. The airbag according to claim 28, wherein the at least one vent hole comprises a pressure-controlled vent hole and at least one permanently open vent hole.

30. The airbag according to claim 1, wherein the intermediate layer is arranged offset relative to the lower airbag layer such that a distance between a peripheral outer edge of the intermediate layer and a peripheral outer edge of the lower airbag layer varies along the peripheral outer edge of the intermediate layer.

31. The airbag according to claim 1, wherein the airbag is configured for use in a front airbag module of the motor vehicle.

32. The airbag according to claim 31, wherein the airbag is configured for use in a driver airbag module of the motor vehicle.

33. An airbag module for a motor vehicle comprising:
an inflation device for inflating an airbag, and the airbag comprising:
an upper airbag layer configured to face an occupant in an inflated state;
a lower airbag layer connected to the upper airbag layer;
an intermediate layer secured to the lower airbag layer and arranged between the upper and lower airbag layers, wherein the intermediate layer divides an interior of the airbag into a first chamber formed by the lower airbag layer and the intermediate layer and a second chamber formed by the intermediate layer and the upper airbag layer;
a gas inlet aperture through which gas originating from the inflation device is able to enter the first chamber; and
an outlet comprising an aperture bounded by a periphery through which gas from the first chamber is able to enter the second chamber,
wherein the outlet is configured such that, according to an amount of gas introduced into the airbag through the inlet aperture, gas selectively fills substantially only the first chamber or both the first and second chambers, and
wherein the outlet is at least partially pressure-controlled such that the periphery of the aperture through which gas from the first chamber flows into the second chamber is torn based on the gas pressure in the first chamber which results in a change in the size of the aperture.

34. The airbag device according to claim 33, wherein the inflation device comprises a multi-stage gas generator such that the airbag may be filled with a variable amount of gas depending on a number of triggered stages of the gas generator.

* * * * *

UNITED STATES PATENT AND TRADEMARK OFFICE
CERTIFICATE OF CORRECTION

| | | |
|---|---|---|
| PATENT NO. | : 7,543,850 B2 | Page 1 of 1 |
| APPLICATION NO. | : 11/806666 | |
| DATED | : June 9, 2009 | |
| INVENTOR(S) | : Milan Bachraty, Andreas Terlunen and Matthias Liebertrau | |

It is certified that error appears in the above-identified patent and that said Letters Patent is hereby corrected as shown below:

ON THE COVER PAGE

Item (30) the Foreign Application Priority Data should read:

(30)         Foreign Application Priority Data

December 2, 2004:         [DE]         10 2004 059 085

Signed and Sealed this

Eighteenth Day of August, 2009

David J. Kappos
*Director of the United States Patent and Trademark Office*